(12) United States Patent
Watt et al.

(10) Patent No.: US 11,787,275 B2
(45) Date of Patent: Oct. 17, 2023

(54) ELECTRIC DRIVE WITH HYDRAULIC MOUNTING INTERFACE

(71) Applicant: Deere & Company, Moline, IL (US)

(72) Inventors: Dwayne B. Watt, Bartlesville, OK (US); Randall L. Long, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 506 days.

(21) Appl. No.: 16/897,464

(22) Filed: Jun. 10, 2020

(65) Prior Publication Data

US 2021/0388825 A1 Dec. 16, 2021

(51) Int. Cl.
| | |
|---|---|
| *F04B 17/03* | (2006.01) |
| *F16H 37/08* | (2006.01) |
| *H05K 5/02* | (2006.01) |
| *B60K 1/00* | (2006.01) |
| *B60K 25/00* | (2006.01) |

(52) U.S. Cl.
CPC .......... *B60K 1/00* (2013.01); *B60K 2025/005* (2013.01); *F04B 17/03* (2013.01)

(58) Field of Classification Search
CPC ..... B60K 1/00; B60K 2025/005; F04B 17/03; H02K 7/116
USPC ...................................................... 310/40 R
See application file for complete search history.

(56) References Cited

U.S. PATENT DOCUMENTS

| | | | |
|---|---|---|---|
| 4,418,777 A | 12/1983 | Stockton | |
| 5,309,778 A | 5/1994 | Antonov | |
| 6,023,134 A | 2/2000 | Carl et al. | |
| 6,078,115 A * | 6/2000 | Uchida | ................. H02K 9/193 |
| | | | 310/58 |
| 8,454,326 B2 | 6/2013 | Grosskopf et al. | |

(Continued)

FOREIGN PATENT DOCUMENTS

| | | |
|---|---|---|
| CN | 106787452 A | 5/2017 |
| DE | 10303050 B4 | 5/2006 |

(Continued)

OTHER PUBLICATIONS

German Search Report issued in application No. DE1021203379.2 dated Nov. 12, 2021 (05 pages).

(Continued)

*Primary Examiner* — Alex W Mok
(74) *Attorney, Agent, or Firm* — KLINTWORTH & ROZENBLAT IP LLP

(57) ABSTRACT

An electric drive assembly for operation with a component of a work vehicle having an SAE standard hydraulic pump/motor mount includes an electric machine having a shaft and a mounting flange. An adapter housing defines an interior space between a component mounting flange and an electric machine mounting flange. The electric machine mounting flange is sized and configured to mate with the mounting flange of the electric machine. The component mounting flange has a bolt hole pattern and a mounting pad each of a complementary size and configuration to that of the SAE standard hydraulic pump/motor mount. A gear set at least in part disposed in the interior space of the adapter housing is configured to effect a gear ratio change and transfer power between the shaft of the electric machine and a drive shaft.

18 Claims, 10 Drawing Sheets

(56) References Cited

U.S. PATENT DOCUMENTS

| | | | | |
|---|---|---|---|---|
| 8,541,915 | B2* | 9/2013 | Burns | B60L 3/0061 |
| | | | | 310/59 |
| 8,776,976 | B2* | 7/2014 | Krafft | H02K 49/043 |
| | | | | 310/105 |
| 9,096,115 | B2 | 8/2015 | Ho et al. | |
| 9,402,344 | B1 | 8/2016 | Wenzel et al. | |
| 9,698,649 | B2* | 7/2017 | Cemke | H02K 5/26 |
| 9,915,192 | B2* | 3/2018 | Buschur | F02B 39/08 |
| 10,099,552 | B2 | 10/2018 | Long et al. | |
| 10,228,027 | B2* | 3/2019 | Jones | F16D 67/04 |
| 10,252,609 | B2* | 4/2019 | Falls | B60K 7/0007 |
| 10,840,768 | B2 | 11/2020 | Suzuki | |
| 2008/0024020 | A1 | 1/2008 | Lund et al. | |
| 2008/0230289 | A1* | 9/2008 | Schoon | B60K 1/02 |
| | | | | 180/65.6 |
| 2011/0215588 | A1 | 9/2011 | Gilbert, Jr. | |
| 2014/0175916 | A1 | 6/2014 | Chamberlin et al. | |
| 2014/0364263 | A1 | 12/2014 | Tokunaga et al. | |
| 2015/0008677 | A1 | 1/2015 | Brock | |
| 2016/0129786 | A1 | 5/2016 | Petersen et al. | |
| 2016/0145833 | A1 | 5/2016 | Abdel-Baqi et al. | |
| 2017/0001629 | A1 | 1/2017 | Vyncke et al. | |
| 2017/0072778 | A1 | 3/2017 | Ornella et al. | |
| 2017/0248196 | A1* | 8/2017 | Turner | F02N 15/022 |
| 2018/0093564 | A1* | 4/2018 | Long | A01D 69/005 |
| 2018/0100564 | A1* | 4/2018 | Fliearman | F16H 3/54 |
| 2018/0162221 | A1* | 6/2018 | Long | F16H 61/0059 |
| 2018/0205286 | A1* | 7/2018 | Barekar | F02B 63/00 |
| 2019/0001826 | A1 | 1/2019 | Suzuki | |
| 2019/0252939 | A1 | 8/2019 | Peiffer et al. | |

FOREIGN PATENT DOCUMENTS

| | | |
|---|---|---|
| DE | 112006000762 T5 | 1/2008 |
| DE | 102007033457 A1 | 2/2008 |
| DE | 102010004596 A1 | 7/2011 |
| DE | 102010010578 B4 | 3/2014 |
| DE | 112010005285 B4 | 2/2015 |
| DE | 102015118535 A1 | 5/2017 |
| JP | 2016166639 A | 9/2016 |

OTHER PUBLICATIONS

Fluidyne Fluid Power, SAE Pump Motor Mounting Flanges and Shafts, undated admitted prior art. (2 pages).

ip.com, Connector Cooling Technique for an Electric Machine, IP.com Prior Art Database Technical Disclosure, Authors et al.: Disclosed Anonymously, IP.com No. IPCOM000258786D, IP.com Electronic Publication Date: Jun. 13, 2019.

Deere & Company, U.S. Appl. No. 16/842,608, filed Apr. 7, 2020.

Deere & Company, U.S. Appl. No. 16/789,070, filed Feb. 12, 2020.

Deere & Company, U.S. Appl. No. 62/889,258, filed Aug. 20, 2019.

Deere & Company, U.S. Appl. No. 62/889,540, filed Aug. 20, 2019.

Deere & Company, U.S. Appl. No. 62/889,258, filed Aug. 20, 2019 which claims the benefit of U.S. Appl. No. 62/889,258, filed Aug. 20, 2019.

German Search Report issued in application No. DE102021200039.8 dated Sep. 21, 2021 (05 pages).

Non-Final Office Action issued in U.S. Appl. No. 16/842,608 dated Feb. 13, 2023 (14 pages).

Non-Final Office Action issued in U.S. Appl. No. 16/789,070 dated Apr. 26, 2023.

* cited by examiner

ELECTRIC DRIVE WITH HYDRAULIC MOUNTING INTERFACE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to electric drives for work vehicles, and in particular to electric drives configured to interchange with hydraulic components.

BACKGROUND OF THE DISCLOSURE

Various work vehicles used in the agriculture, construction and forestry industries may have hydraulic drives for powering various onboard and offboard components (e.g., clutches, wheel drives, work implements, etc.). Such work vehicles may also have an electric system for supplying electrical power to various onboard and offboard electric components and for generating power that may be stored by onboard and/or offboard storage devices.

SUMMARY OF THE DISCLOSURE

The disclosure provides an electric drive assembly for a component of a work vehicle with an SAE standard hydraulic pump/motor input and/or output mounting interface.

In one aspect, the disclosure provides an electric drive assembly for operation with a component of a work vehicle having an SAE standard hydraulic pump/motor mount. The electric drive assembly includes an electric machine having a shaft and a mounting flange. An adapter housing defines an interior space between a component mounting flange and an electric machine mounting flange. The electric machine mounting flange is sized and configured to mate with the mounting flange of the electric machine. The component mounting flange has a bolt hole pattern and a mounting pad each of a complementary size and configuration to that of the SAE standard hydraulic pump/motor mount. A gear set at least in part disposed in the interior space of the adapter housing is configured to effect a gear ratio change and transfer power between the shaft of the electric machine and a drive shaft.

In another aspect, the disclosure provides a method of manufacturing an electric drive assembly for operation with a component of a work vehicle having an SAE standard hydraulic pump/motor mount. The method includes providing an electric machine having a shaft and a mounting flange. The method also includes forming an adapter housing defining an interior space between a component mounting flange and an electric machine mounting flange. The electric machine mounting flange is sized and configured to mate with the mounting flange of the electric machine. The component mounting flange has a bolt hole pattern and a mounting pad each of a complementary size and configuration to that of the SAE standard hydraulic pump/motor mount. The method also includes mounting the mounting flange of the electric machine to the electric machine mounting flange of the adapter housing. The method also includes installing a gear set at least in part in the interior space of the adapter housing to couple the shaft of the electric machine to a drive shaft. The gear set is configured to effect a gear ratio change and transfer power between the shaft of the electric machine and the drive shaft.

The details of one or more embodiments are set forth in the accompanying drawings and the description below. Other features and advantages will become apparent from the description, the drawings and the claims.

BRIEF DESCRIPTION OF THE DRAWINGS

Like reference symbols in the various drawings indicate like elements.

DETAILED DESCRIPTION

Figure 1:
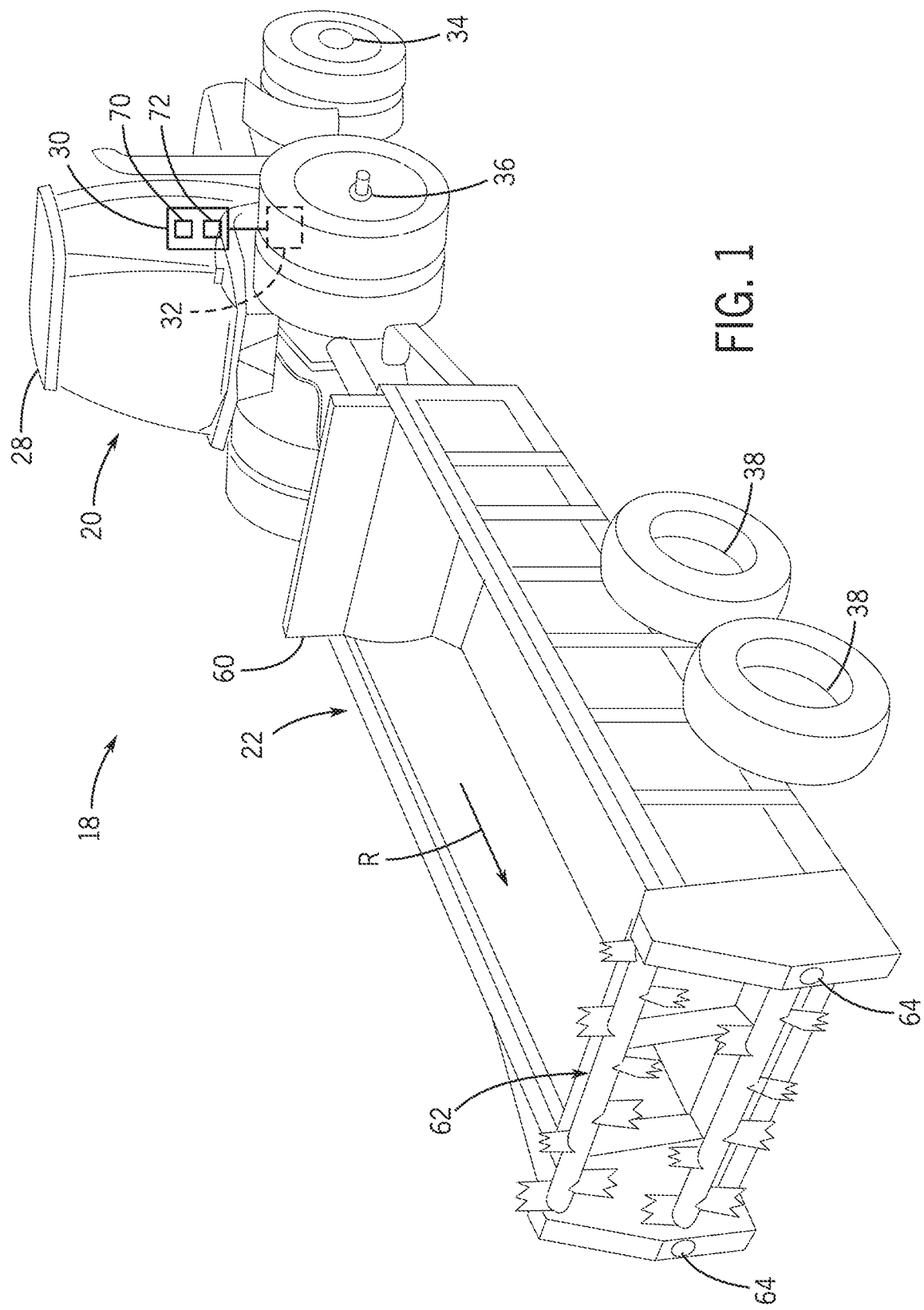
FIG. 1 is a simplified perspective view of an example work vehicle train, with a towing work vehicle in the form of an agricultural tractor and a towed work implement in the form of a manure spreader, in which an electric drive may be used in accordance with this disclosure.

The following describes one or more example embodiments of the disclosed work vehicle electric drive assembly, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "downstream," "upstream," "longitudinal," "radial," "axial," "circumferential," "lateral" and "transverse" may be used. Such terms are defined, at least in part, with respect to an electric machine, a passage or circuit for fluid flow, a rotor, a rotating shaft and/or a stator. As used herein, the term "longitudinal" indicates an orientation along the length of the apparatus; the term "lateral" indicates an orientation along a width of the apparatus and orthogonal to the longitudinal orientation; and the term "transverse" indicates an orientation along the height of the apparatus and orthogonal to the longitudinal and lateral orientations. These orientations may be taken in relation to a work vehicle, or a travel direction of the work vehicle, to which the components may be attached.

OVERVIEW

Work vehicles may include sophisticated electric and hydraulic systems that operate various onboard and offboard components and implements to perform various work operations. Such electric and hydraulic systems are often powered by a prime mover (e.g. internal combustion engine, one or more battery-powered electric motors) that provides the tractive power necessary to propel the work vehicle. To achieve a required operating power, hydraulic motors, operating by hydraulic pressure achieved by pumps driven through mechanical input from the engine, may be used. Hydraulic pumps and motors may be coupled to the upstream mechanical input power and the downstream components that they power through hydraulic interfaces of various configurations. Some such mounting interfaces may be application-specific or proprietary mounts with special or non-standard configurations. However, the Society of Automotive Engineers (SAE) has standardized certain hydraulic pump and motor mounting interfaces generally ranging from SAE AA to SAE F each with specific rotating shaft and mounting flange size and configuration aspects. The SAE hydraulic pump and motor standards prescribe keyed- or splined-shaft diameters and lengths and mounting flange bolt hole patterns (hole size and spacing, in two- or four-bolt configurations) and mounting pad pilot diameters and lengths.

This disclosure pertains to electrifying typically hydraulically-powered components by providing an electric machine and gear set adapter having one or more SAE standard mounting interfaces. In one aspect of the disclosure, the gear set is configured to provide a gear ratio to mechanically generate a torque and a speed output at the gear set adapter that is different from that at the rotating shaft of the electric machine itself. For example, the gear set may provide a lower speed, higher torque output than would otherwise come from the electric machine. Whether the gear ratio effects a higher or lower speed and torque, its power characteristics may be configured to match the power requirements of a driven component. Thus, the electric machine and gear set may provide a replacement or substitute for hydraulic pump and motor, which has the benefit of reduced cost and complexity as compared to hydraulic arrangements and the requisite pressurized fluid circuit. It also facilitates integration with all electric systems that may lack an engine or other mechanical power source.

In various embodiments, the gear set may be installed in an adapter housing with an electric motor mounting flange and a component mounting flange. Further, in some examples, the work vehicle component to be driven has an SAE standard hydraulic pump/motor mount that is either an SAE C hydraulic pump/motor mount or an SAE D hydraulic pump/motor mount, in which case a component mounting flange of the adapter housing is a complementary SAE C hydraulic pump/motor mount or SAE D hydraulic pump/motor mount. Other embodiments of the work vehicle component mount and complementary adapter housing may include SAE CC, SAE E, and/or any other preselected size(s).

The adapter housing may be a unitary component (e.g., a casting) having one or more features for each of multiple SAE hydraulic pump/motor mounts. As one example, the component mounting flange of the adapter housing may be an SAE C hydraulic pump/motor mount including a corresponding bolt hole pattern and mounting pad, and the component mounting flange of the adapter housing may include one or features of an SAE D hydraulic pump/motor mount. The one or more features of an SAE D hydraulic pump/motor mount include a bolt hole pattern and a mounting pad of an SAE D hydraulic pump/motor mount. The component mounting flange of the adapter housing is formed so that the bolt hole pattern and the mounting pad of an SAE D hydraulic pump/motor mount are located in spaced relation to the bolt hole pattern and the mounting pad of an SAE C hydraulic pump/motor mount and thus neither interfere with mounting of the drive with the other mount.

As noted above, the disclosure also provides a method of manufacturing an electric drive assembly for operation with a component of a work vehicle having an SAE standard hydraulic pump/motor mount, such as to initially include both an SAE C hydraulic pump/motor mount and an SAE D hydraulic pump/motor mount. In certain embodiments, the method includes casting the adapter housing as a unitary part with the component mounting flange and the electric machine mounting flange, and machining one or more features of the SAE C hydraulic pump/motor mount and the SAE D hydraulic pump/motor mount. The machining may include drilling a bolt hole pattern in the adapter housing for the SAE C hydraulic pump/motor mount. The machining includes abrading one or more surfaces of a mounting pad for the SAE C hydraulic pump/motor mount and/or the SAE D hydraulic pump/motor mount.

In certain embodiments, the electric drive may be configured to operate alternatively as a motor in which power flows from the electric machine and into, through and out of the adapter gear set, and as a generator, in which power flows from the adapter gear set into the electric machine. In additional embodiments, the gear set may be a planetary set having a ring gear, a sun gear, and planet gears mounted to a carrier. The ring gear may couple to the output drive shaft, and the sun gear may couple to the rotor and shaft of the electric machine. The planetary set may thus be configured as sun in, ring out in the motor power flow direction and ring in, sun out in the generator power flow direction. In some configurations, the carrier may be fixed against rotation with respect to the adapter housing.

In still other embodiments, the adapter gear set and/or an intermediate housing can accommodate different electric machines mounted in multiple different orientations rotated about a drive axis. The electric machine mounting flange of the adapter housing may define a cover feature configured to close off a coolant passage of the electric machine in one or more of the mounting orientations. The adapter housing (e.g., at least in part by the electric machine mounting flange) may also define a drain well with a drain opening configured to interface the interior of the adapter housing with a drain component to direct coolant from a drain of the electric machine to the drain component. The drain well is located so as not to interfere with installation of the bolts in the bolt holes from the electric motor side of the mounting flange.

The following describes one or more example implementations of the disclosed electric drive. Discussion herein may sometimes focus on the example application of an electric drive assembly in a work vehicle train for offboarding power from a towing agricultural tractor to a towed implement. However, the disclosed drive is applicable to other types of drive components and work vehicles, including various other construction machines (e.g., crawlers, motor graders, dump trucks) as well as various other agriculture or forestry machines (e.g., combines, harvesters, balers, mowers, forwarders, forestry skidders and so on) and utility vehicles.

Example Embodiments of Electric Drive

Referring to FIG. 1, in some embodiments, the disclosed work vehicle train 18 includes a towing work vehicle 20 and a towed work implement 22. In the illustrated example, the work vehicle 20 may be an agricultural tractor and the work implement 22 may be a manure spreader towed behind the agricultural tractor. It will be understood, however, that other configurations may be possible, including configurations with the work vehicle 20 as a different kind of tractor, or as a work vehicle used for other aspects of the agriculture industry or for the construction and forestry industries (e.g., a harvester, a wheel loader, a log skidder, and so on). It will further be understood that other work implements may be utilized, including other towed implements, front-mounted implements, onboard devices, and the like.

Generally, the work vehicle 20 includes a power system 24 that supplies and distributes power about the work vehicle train 18. The work vehicle 20 includes a main frame or chassis 26, an operator cabin 28, a control system 30, and a hydraulic system 32. The work vehicle 20 and the work implement 22 may be supported off the ground by ground-engaging wheels, dual wheels or tracks. In the illustrated example, the work vehicle 20 includes steerable front wheels 34 and rear wheels 36, and the work implement 22 includes trailer wheels 38. The chassis 26 supports the operator cabin 28 in which operator interface and controls (e.g., various joysticks, switches, levers, buttons, touchscreens, keyboards, speakers and microphones associated with a speech recognition system) are provided. As shown in the simplified schematic of FIG. 2, the power system 24 includes a prime mover, in this example an engine 40, a transmission 42, and an auxiliary power system 50 with an electric drive 52 to deliver power to the work implement 22. The engine 40 may be an internal combustion engine or other suitable power source that is coupled to propel the work vehicle 20 via the transmission 42 and the wheels 34, 36) and to power various onboard and offboard subsystems, including various electric and hydraulic components of the work vehicle 20 and work implement 22.

The work implement 22 of the illustrated example is a manure spreader supported on the wheels 38 to be pulled behind the work vehicle 20. The work implement 22 draws power, at least in part, from the power system 24 for operating various powered components such as a pushgate 60, a beater assembly 62, signal lights 64, and a powered wheel end, including a final drive gear set 66 and an electric motor 90 (shown schematically in FIG. 2), for each wheel 38. The final drive gear set 66 may be any suitable gear arrangement for rotating the wheels 38 at a desired speed and torque, including, for example, a simple or complex planetary gear set having an input member configured to be driven by the electric motor 90 and an output member coupled to the wheel hub (not shown) of the associated wheel 38. In use, the manure spreader work implement 22 is pulled behind the agricultural tractor work vehicle 20. In a crop field, the beater assembly 62 spins to dice and distribute the manure behind the work implement 22. The pushgate 60 is driven rearward in direction R to supply manure to the beater assembly 62 by an extendable piston (not shown). The powered wheel ends would typically be hydraulically powered (e.g., via the hydraulic system 32). Hydraulic power may also drive rotational movement of the beater assembly 62 and/or the linear movement of the pushgate 60.

Generally, the engine 40 may provide mechanical power that is converted to an electric format to run the electronics of the control system 30 and one or more electric drives 52 of the work vehicle 20. The control system 30 thus may have mechanical to electrical power conversion components 70, one or more batteries 72, and associated electronics, including various alternators, generators, voltage regulators, rectifiers, inverters, and the like. The electric drive(s) of the work vehicle may likewise have corresponding inverters and the like for proper power conversion and delivery to components. The engine 40 may also provide mechanical power that is converted to hydraulic format to power various pumps and compressors that pressurize fluid to drive various actuators of the hydraulic system 32 to power components of the work vehicle 20 such as the tow-behind work implement 22, wheel steering and braking, an onboard work implement (not shown), or the like. The hydraulic system 32 may be coupled to and operated by the control system 30 in response to commands from an operator input device (e.g., operator controls, operator display device, etc.) in the cabin 28 or remote from the work vehicle 20. The hydraulic system 32 may include other components (e.g., valves, flow lines, pistons/cylinders, seals/gaskets, and so on), such that control of various devices may be effected with, and based upon, hydraulic, mechanical, or other signals and movements.

The control system 30 may be configured as a computing device with associated processor devices and memory architectures, as a hard-wired computing circuit (or circuits), as a programmable circuit, as a hydraulic, electrical, or electro-hydraulic controller. The control system 30 may be configured to execute various computational and control functionality with respect to the work vehicle 20, including various devices associated with the power system 24, the hydraulic system 32, and various additional components of the work vehicle 20. In some embodiments, the control system 30 may be configured to receive input signals in various formats (e.g., as hydraulic signals, voltage signals, current signals, and so on), and to output command signals in various formats (e.g., as hydraulic signals, voltage signals, current signals, mechanical movements such as rotation, and so on). The control system 30 is configured to operate various aspects of the disclosed electric drive 52, which may form part of the power system 24 or part of another subsystem of the work vehicle 20.

Figure 2:
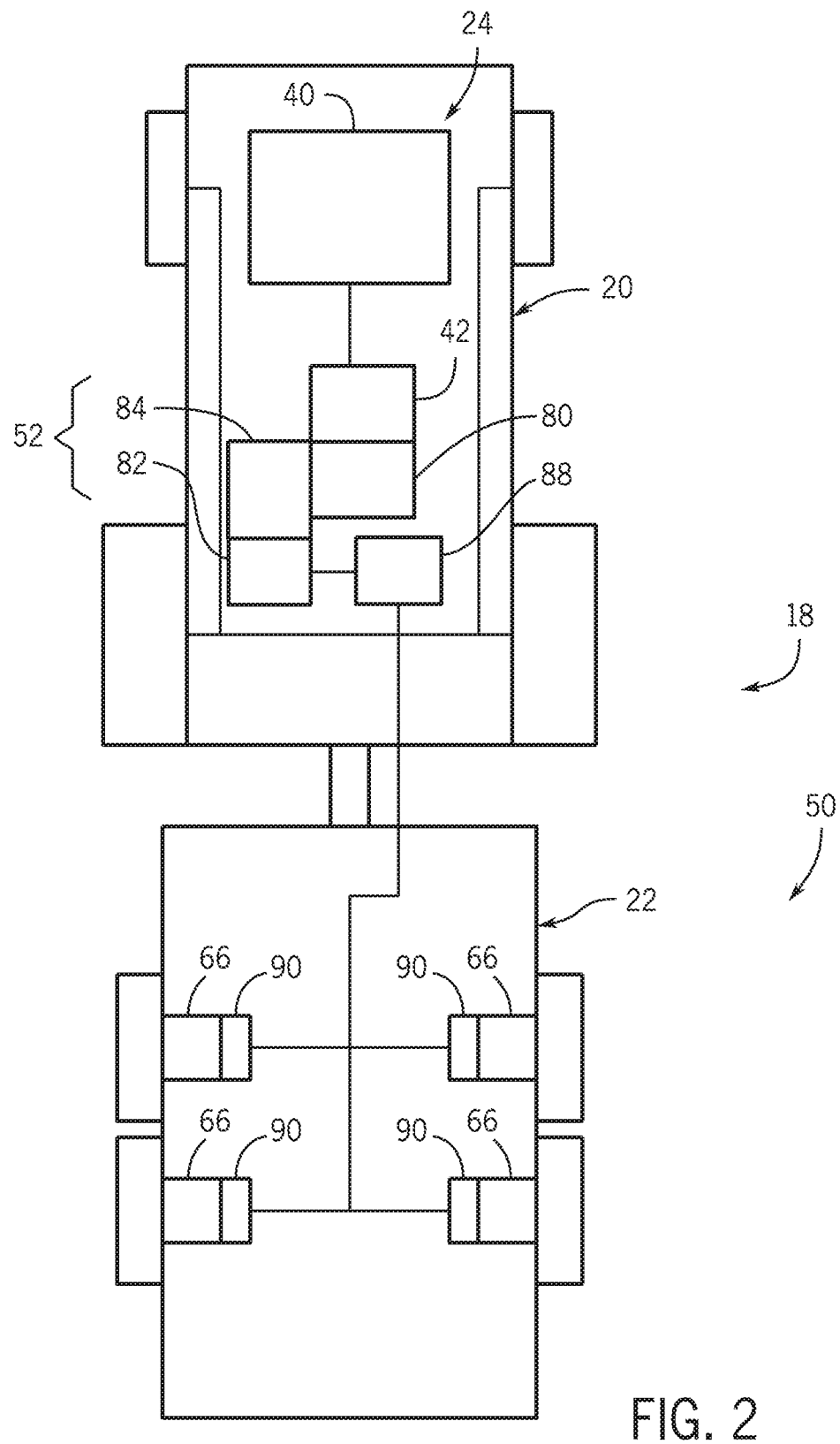
FIG. 2 is a simplified schematic view of an example power system arrangement for the work implement and work vehicle of FIG. 1.

An example arrangement of the power system 24 and auxiliary power system 50 is illustrated in greater detail in FIG. 2, which provide power from the electric drive 52 at the work implement 22 for substituting hydraulic power. In this example, certain components of the auxiliary power system 50 are located onboard the work vehicle 20 to mate with a hydraulic pump manifold 80. The hydraulic pump manifold 80 receives mechanical power from the transmission and transfers this power to one or more auxiliary outputs (e.g., via internal gear train(s)). The hydraulic pump manifold 80 may have a single output or multiple outputs. The electric drive 52 is defined by an electric machine 82 (e.g., a permanent magnet motor) and a gear set 84 that are coupled as a unit to be operable as a motor or a generator. In the illustrated example, the electric drive 52 operates as a generator with the gear set 84 of the electric drive 52 mechanically coupled to an output of the hydraulic pump manifold 80 for transferring torque. The electric drive 52 interfaces with the hydraulic pump manifold 80 in this manner to substitute electric power for hydraulic power. The gear set 84 then transfers mechanical power to the electric machine 82 of the electric drive 52, which produces DC electrical power. An inverter 88 converts the electrical energy (e.g., converts direct current (DC) to alternating current (AC)) for transfer to one or more electric motors 90 on the work implement 22. In the illustrated example, the four electric motors 90 are provided, one at each of the wheels 38 to power the final drive gear sets 66. The combination of the electric drive 52, inverter 88, and the electric motors 90 constitutes a motoring unit that replaces a hydraulic pump and motor of typical arrangements. This replacement of hydraulic components with electric components may provide various cost and efficiency improvements to the operation of the work vehicle 20.

Figure 3A:
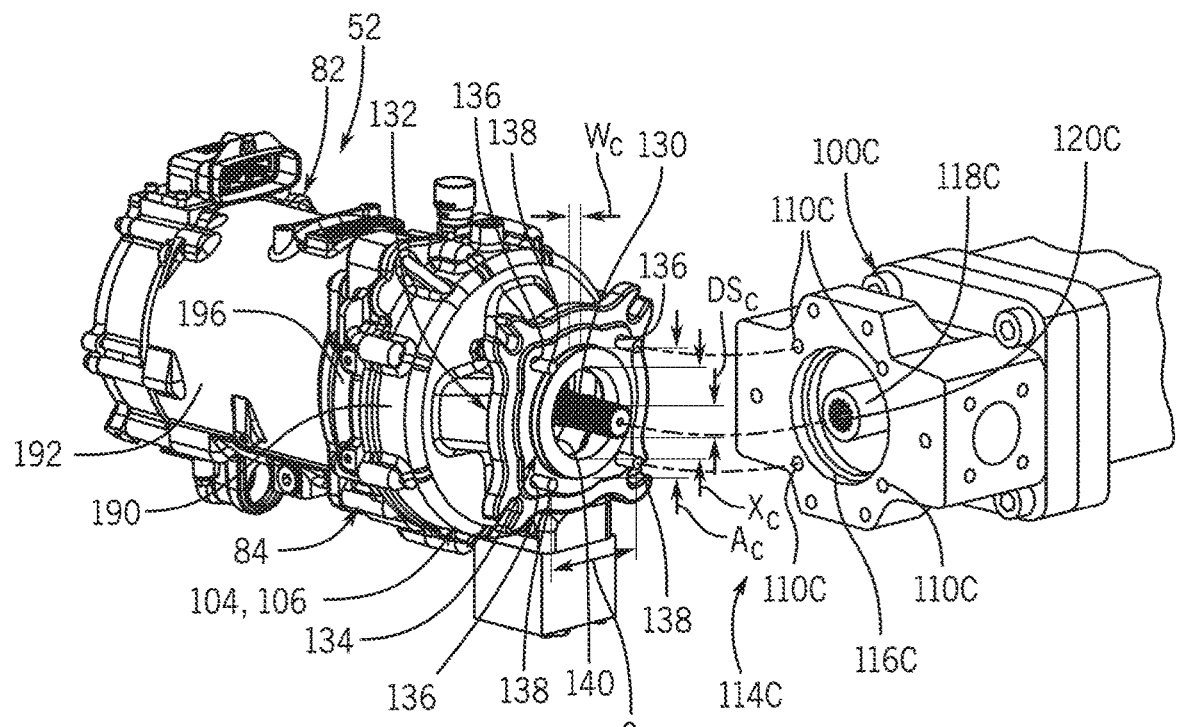
FIG. 3A is an isometric view of an example electric drive and SAE C compatible hydraulic pump/motor mount.
Figure 3B:
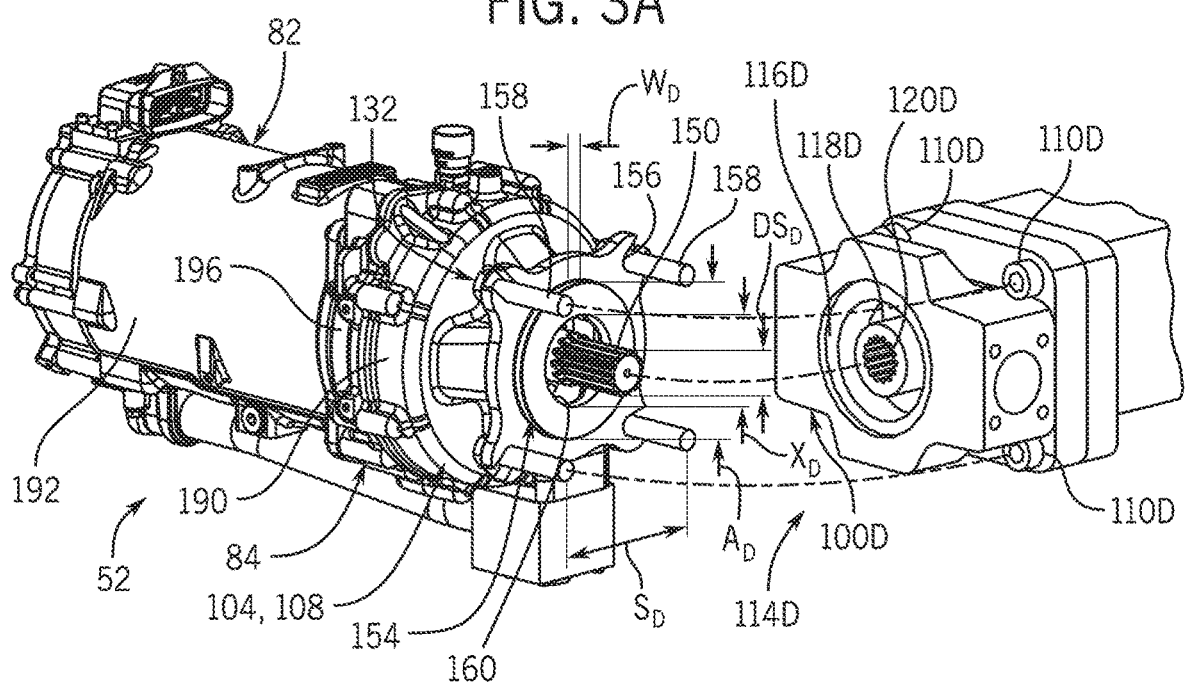
FIG. 3B is an isometric view of another example electric drive and SAE D compatible hydraulic pump/motor mount.

Referring also to FIGS. 3A and 3B, the example electric drive 52 is shown for mounting to a corresponding hydraulic pump/motor mount being an SAE C hydraulic pump/motor mount 100C or an SAE D hydraulic pump/motor mount 100D. The electric drive 52 includes the electric machine 82 (e.g., a motor) with an adapter housing 104 (e.g., an SAE C adapter housing 106 or an SAE D adapter housing 108) with a complementary predetermined configuration for interfacing and mounting to the hydraulic pump/motor mount 100C, 100D. The illustrated hydraulic pump/motor mount 100C, 100D may be provided at various locations on the work vehicle 20 or the work implement 22 where the electric drive 52 may be implemented. In particular, the hydraulic pump/motor mount 100C, 100D includes a plurality of bolt holes 110C, 110D which in certain examples may be a bolt hole pattern of two or four bolt holes 110C, 110D that receive bolts 112C, 112D for fixedly connecting the electric drive 52. The SAE C or D hydraulic pump/motor mount 100C, 100D includes one or more features that are in a predetermined arrangement, including a plurality of bolt holes 110C, 110D in a bolt hole pattern 114C, 114D with a circular mounting pad 116C, 116D recessed within the bolt hole pattern 114C, 114D. A shaft receiver 118C, 118D has an opening 120C, 120D for a drive shaft 130, 150 of the electric drive 52. The shaft receiver 118C, 118D has complementary structures such as splines for interfitting with splines on the drive shaft 130, 150 for co-rotation and efficient transfer of torque.

The adapter housing 104 of the electric drive 52 provides a component mounting flange 132 with complementary structures of predetermined dimensions to couple with the hydraulic pump/mount 100C or 100D, for example the predetermined dimensions are an SAE standard for either an SAE C hydraulic pump/motor mounting flange or an SAE D hydraulic pump/motor mounting flange. In particular, the component mounting flange 132 includes a complementary arrangement of a mounting pad and a plurality of bolt holes. In the SAE C arrangement of FIG. 3A, a mounting pad 134 defines an inner diameter $X_C$ of 2.5 in., an outer diameter $A_C$ of 5.0 in., and a depth $W_C$ of 0.5 in. A plurality of bolt holes 136, for bolts 138, are in a four-bolt pattern with bolt holes 136 arranged in a square with a length $S_C$ of 4.5 in. from center-to-center of sequential bolt holes 136. The drive shaft 130 extends through an opening 140 of the mounting pad 134 and is dimensioned according to the SAE C standard including a shaft diameter $DS_C$. The SAE C standard for drive shafts encompasses variations in shaft length, threading, splines, and shape (straight, tapered). In the SAE D arrangement of FIG. 3B, the component mounting flange 132 includes a mounting pad 154 that defines an inner diameter $X_D$ of 2.75 in., an outer diameter $A_D$ of 6.0 in., and a depth $W_D$ of 0.5 in. A plurality of bolt holes 156, for bolts 158, are in a four-bolt pattern with bolts holes 156 arranged in a square with a length $S_D$ of 6.364 in. from center-to-center of sequential bolt holes 156. Similar to the previous example, the drive shaft 150 extends through the opening 160 of the mounting pad 154 and is dimensioned according to the SAE D standard with a diameter $DS_D$ and encompassing variations in shaft length, splines, threading, and shape (e.g., straight, tapered). Additionally, the adapter housing 108 has open space clearance regions 162 (FIGS. 4B, 5B, 6) located at the four corners of the component mounting flange 152 to accommodate lateral installation of the bolts 158 into the corresponding bolt holes 156 from between the mounting flange 152 and inner wall 204 of the adapter housing 108 in the SAE D mounting configuration.

Figure 5A:
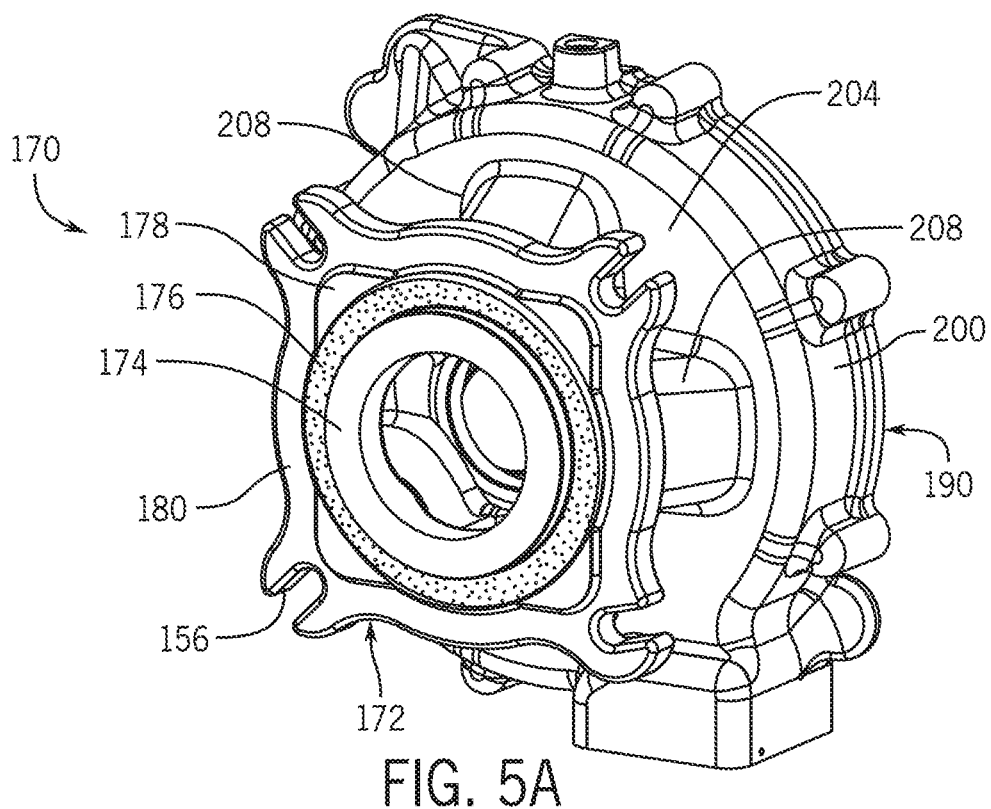
FIG. 5A is an isometric view of a cast adapter housing before being machined into the adapter housing of FIG. 4A.
Figure 5B:
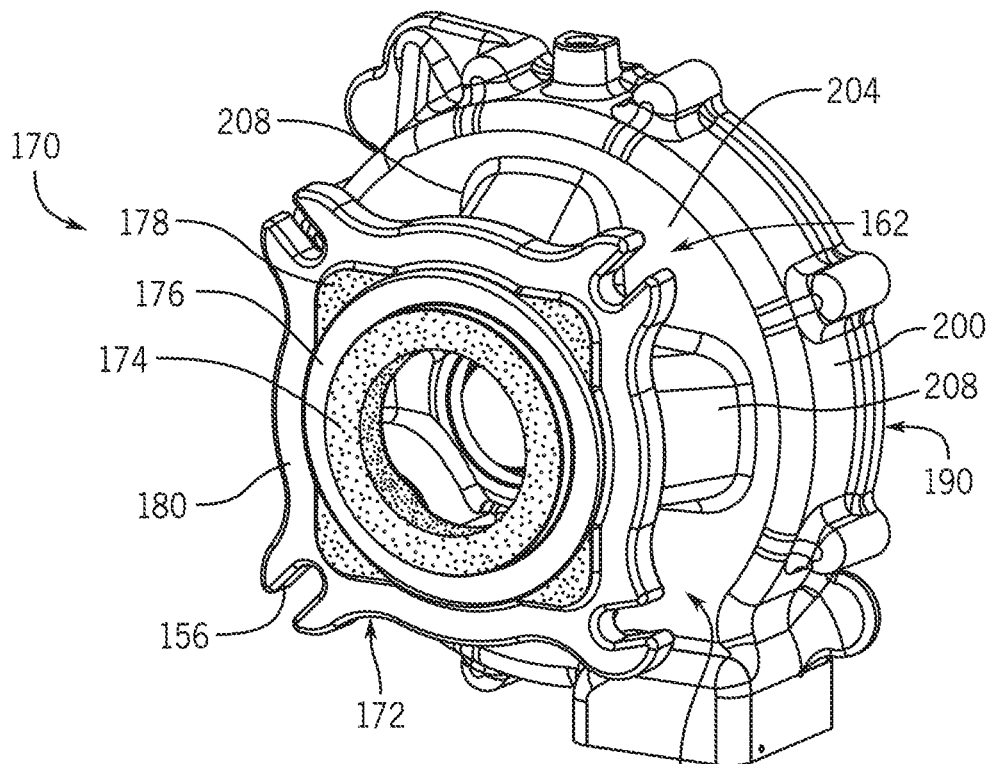
FIG. 5B is an isometric view of a cast adapter housing before being machined into the adapter housing of FIG. 4B.

The adapter housing 104 of the illustrated examples may be sourced from a unitary raw metal part, for example a raw casting 170, as shown in FIGS. 5A and 5B. Using a single raw casting 170 for multiple adapter housing applications reduces part inventory and associated manufacturing costs for multiple adapter housing applications. To provide the desired final part, material is machined away (e.g., via milling, abrading, grinding, or the like) from a base flange 172 of the raw casting 170 until the component mounting pad 134, 154 of the particular adapter housing 106, 108 has the desired dimensions, such as SAE C or SAE D standard dimensions. The base flange 172 in this form includes an inner pad 174, an outer pad 176, an inner bolt region 178, and an outer bolt region 180 with slots defining the bolt holes 156. In this manner, one raw casting 170 is manufactured that can be finished to either an SAE C or an SAE D arrangement of the desired adapter housing 106, 108. Accordingly, the raw casting 170 is a unitary component having one or more features (e.g., bolt holes, mounting pads, and the like) for each of multiple SAE hydraulic pump/motor mounts 100C, 100D.

Figure 4A:
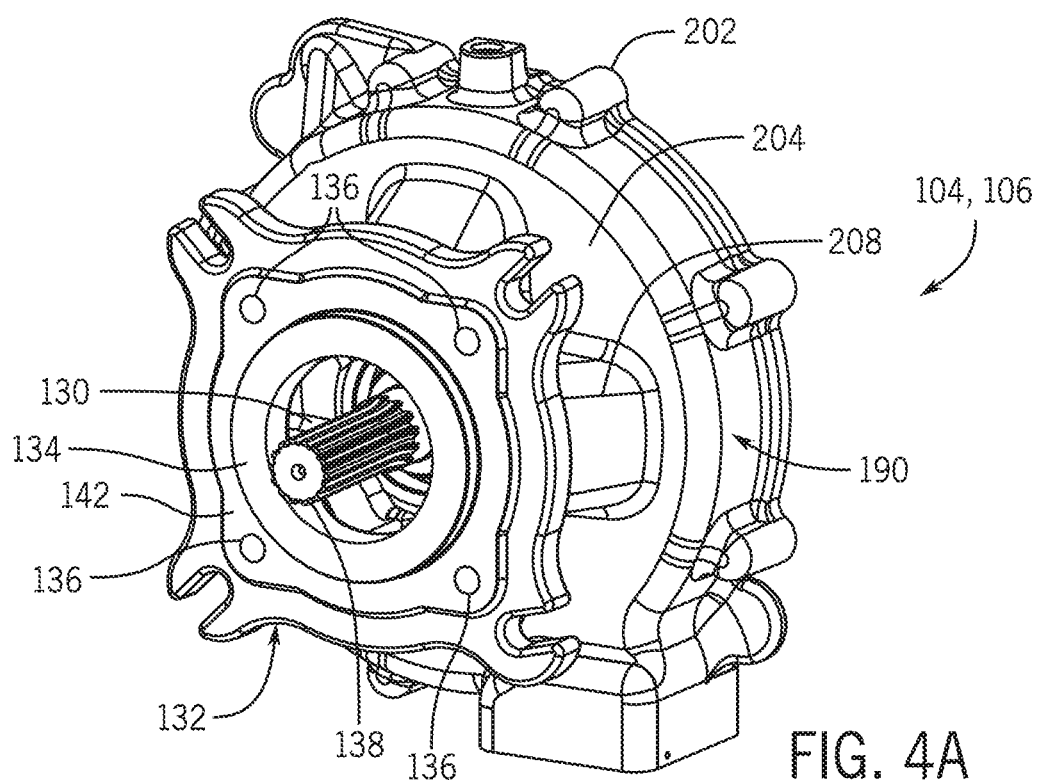
FIG. 4A is an isometric view of an SAE C compatible example of an adapter housing for an electric machine for use in the electric drive of FIG. 3A.
Figure 4B:
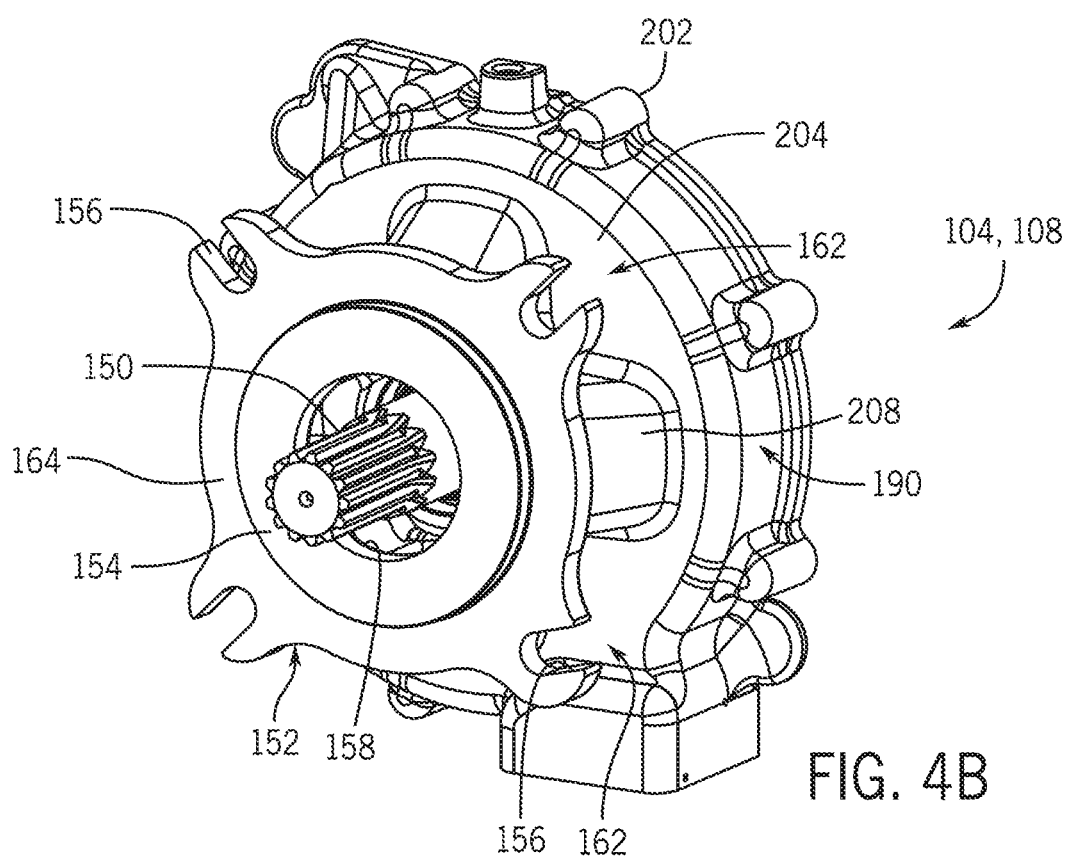
FIG. 4B is an isometric view of an SAE D compatible example of an adapter housing for an electric machine for use in the electric drive of FIG. 3B.

The surfaces of the final adapter housing 104 that are machined after casting are shown as stippled surfaces in FIGS. 5A and 5B. The machining achieves the particular desired SAE standard arrangement (shape, dimensions, etc.). Referring also to FIG. 4A, for the SAE C component mounting flange 132, the inner pad 174 of the raw casting 170 is abraded to form the mounting pad 134 and the bolt holes 136 are drilled to the predetermined standard size and pattern. The inner bolt region 178 is machined as well, eliminating the outer pad 176 of the raw casting 170. The outer bolt region 180 may not be machined although it is not used in the SAE C application because it does not obstruct the SAE C application. Referring also to FIG. 4B, to form the SAE D component mounting flange 152, the inner pad 174 of the raw casting 170 is eliminated by machining, the surfaces of the outer pad 176 are abraded to form the mounting pad 154, the outer bolt region 180 is abraded. The slots defining the bolt holes 156 may be drilled or machined as well to closely correspond to the predetermined standard size and pattern. It will be appreciated that the majority of the adapter housing 104 is not machined for a particular application, but is instead shared across both applications. It is also noted that areas of the raw casting 170 other than as shown in FIGS. 5A and 5B may be machined or otherwise surface treated.

Figure 6:
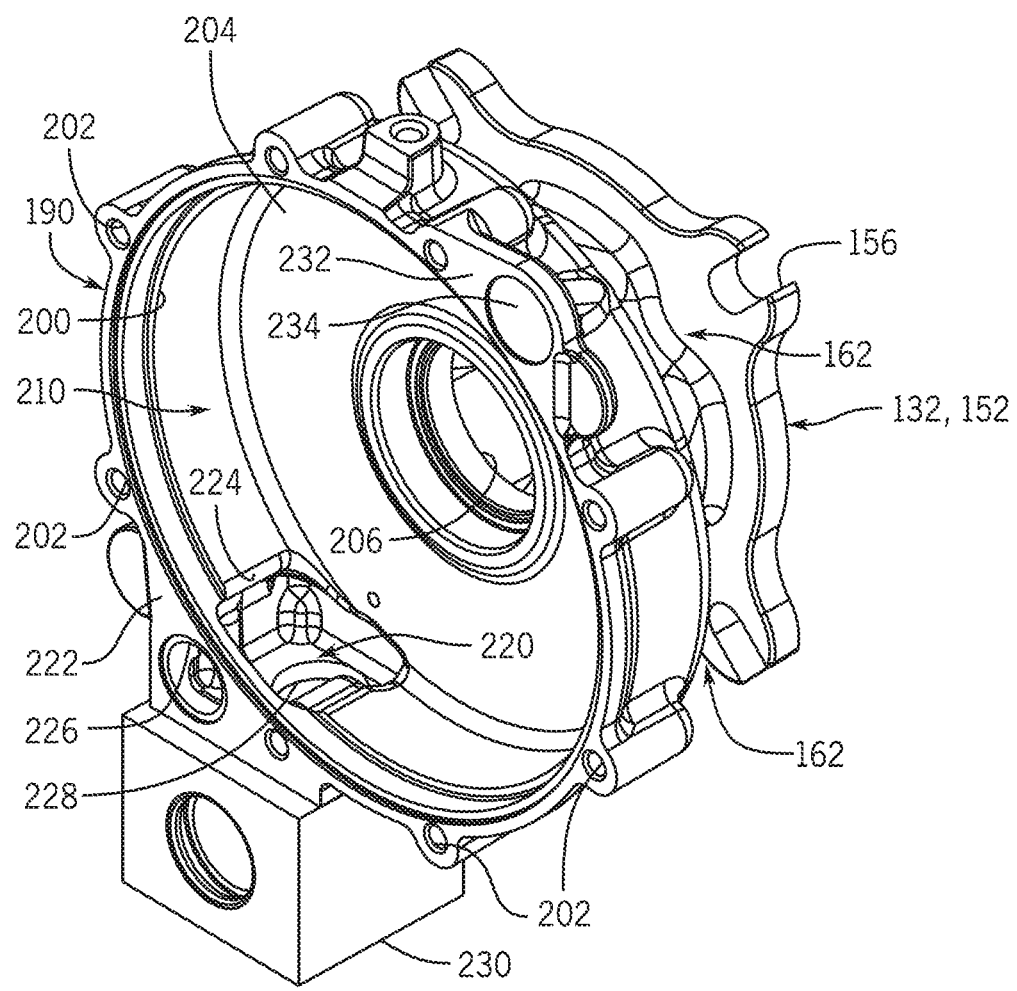
FIG. 6 is a rear isometric view of the adapter housing of FIGS. 4A-5B.
Figure 7:
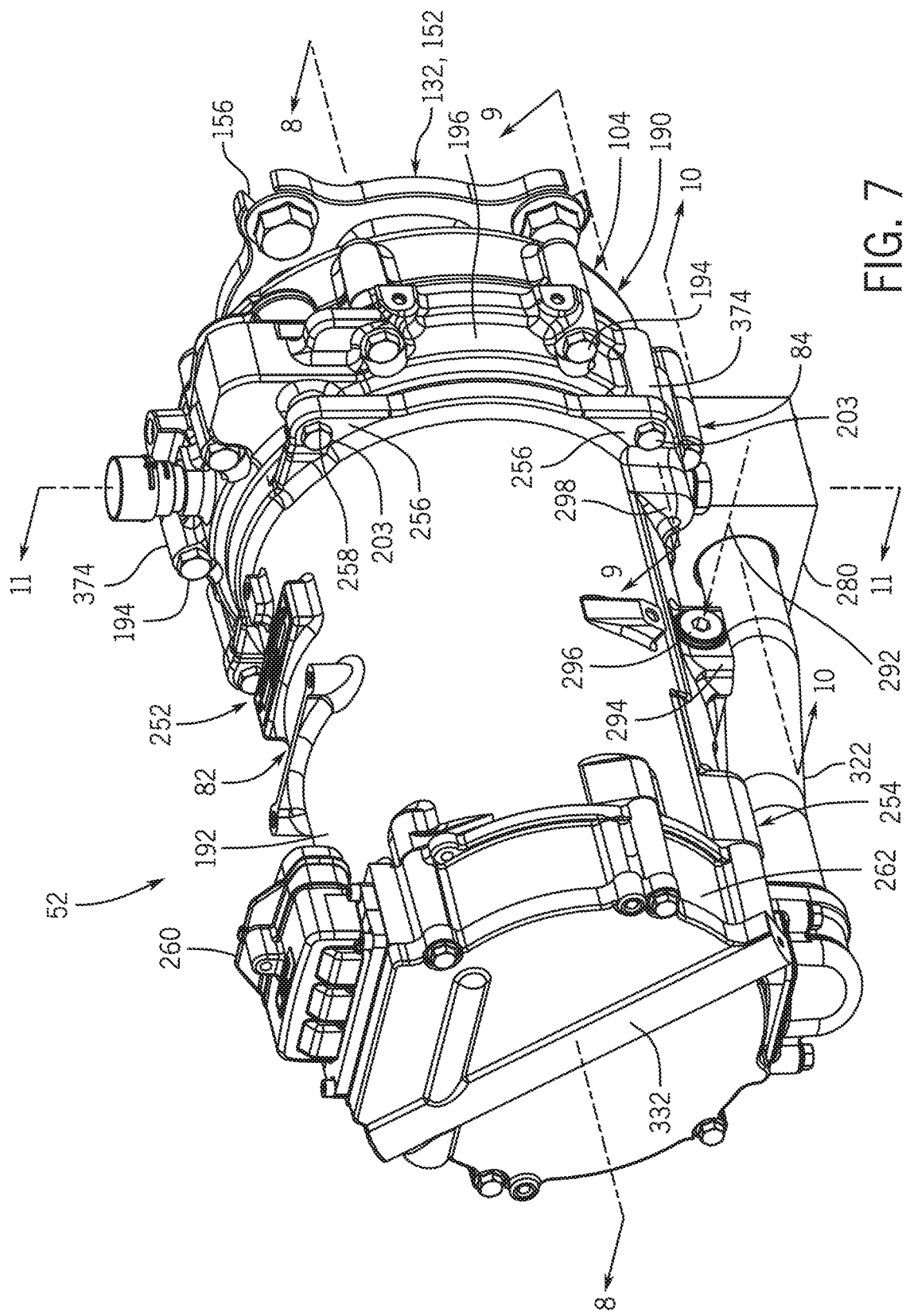
FIG. 7 is an isometric view of an example electric drive for use in the power system arrangements of FIGS. 2A-2B and including an adapter housing.

Referring also to FIGS. 6 and 7, at an opposite end from the component mounting flange 132, 152, the adapter housing 104 has an electric machine mounting flange 190 dimensioned to mate (directly or indirectly) with an electric machine housing 192, for example mounted by bolts 194. In the illustrated example, the electric machine mounting flange 190 attaches to an intermediate housing 196 that subsequently attaches to the electric machine housing 192. The electric machine mounting flange 190 of the adapter housing 104 includes an annular wall 200 having mounting bolt holes 202 that receive the bolts 194 for mounting with the intermediate housing 196. The intermediate housing 196 is subsequently mounted to the electric machine 82 by a plurality of bolts 203. The bolts 194 are arranged symmetrically about the perimeter of the adapter housing 104 and the intermediate housing 196, allowing for multiple mounting positions rotated relative to each other. Similarly, the plurality of bolts 203 are arranged symmetrically about the perimeter of the intermediate housing 196 and the electric machine 82, allowing for multiple mounting positions rotated relative to each other. In one example, the electric machine 82 may be rotated 180 degrees about a drive axis D (FIG. 8) for attachment to the intermediate housing 196.

An inner wall 204 of the adapter housing 104 extends radially inward from the electric machine mounting flange 190 to enclose the gear set 84. The inner wall 204 also defines an opening 206 for the drive shaft 130, 150 of the electric drive 52. Tapered walls 208 connect the component mounting flange 132, 152 with the electric machine mounting flange 190. Accordingly, the clearance regions 162 are defined by the inner face 204, the tapered walls 208 and the component mounting flange 132, 152. The tapered walls 208 extend an axial distance, and are at a radially inward location with respect to the outer periphery of the component mounting flange 132, 152, to allow manual insertion of the bolts 156, with the bolt heads being captured between the inner wall 204 and the component mounting flange 132, 152. This permits the bolts 156 to be threaded into the bolt holes 110D of the hydraulic pump/motor mount 100D in the SAE D mounting configuration. The clearance regions 162 also provide space for tooling (e.g., a wrench) to couple to the bolt heads for tightening the bolts 156 during installation of the electric drive 52.

The adapter housing 104 also defines an interior space 210 within the annular wall 200. The gear set 84 is disposed, at least in part, in the interior space 210. The adapter housing 104 additionally functions to collect and direct flows of used coolant from the electric drive 52. The annular wall 200 of the electric machine mounting flange 190 of the adapter housing 104 defines a drain well 220 in a box flange 222 extending from an open portion 224 of the annular wall 200. The open portion 224 conveys used coolant that falls from the gear set 84. The box flange 222 includes an inlet port 226 at an axial face thereof for conveying used coolant from the electric machine 82 via the intermediate housing 196. The drain well 220 has a drain opening 228 for directing used coolant to a drain component 230 of the electric drive 52. Diametrically opposed to the box flange 222 and the inlet port 226, the adapter housing 104 includes a planar flange 232 with a cover feature 234 that is generally circular. When the electric machine 82 and/or the intermediate housing 196 are alternatively mounted in a position rotated 180 degrees about the drive axis D, the cover feature 234 blocks off the corresponding coolant flow from the intermediate housing 196.

Figure 8:
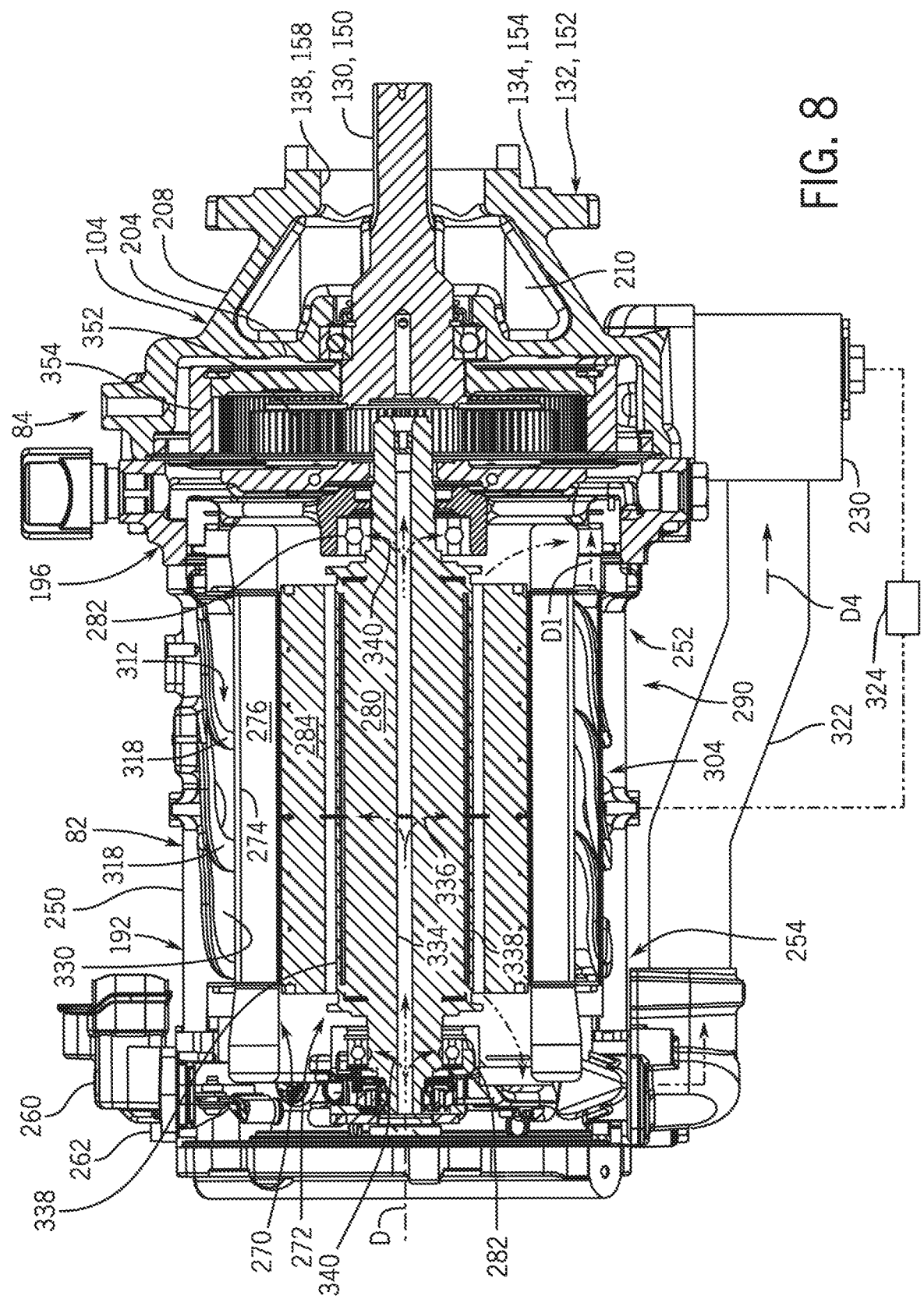
FIG. 8 is a cross-sectional view of the example electric drive taken at plane 8-8 of FIG. 7.

Turning to the details of the example electric machine 82 and referring also to FIG. 8, the electric machine housing 192 has a generally hollow annular (e.g., cylindrical) shape with an exterior peripheral surface 250 extending about the drive axis D from a first axial end (e.g., a drive end 252) to a second axial end (e.g., a non-drive end 254). The drive end 252 may include one or more mounting flanges 256 with a plurality of mounting bores 258 for attachment (e.g., via the bolts 203) to the intermediate housing 196 of the gear set 84 or another nearby fixed component. One or more connectors 260 are arranged on the electric machine housing 192 for various purposes, such as supplying power from the power system 24 or batteries 72 and providing wired electrical connection with the control system 30. An end section 262 of the electric machine housing 192 is also a hollow annular shape that axially encloses the non-drive end 254.

The electric machine 82 of the illustrated example is a permanent magnet motor including a stator 270 and a rotor 272. The stator 270 includes a core 274 arranged in an annular shape coaxial with the rotor 272 and may be formed from a solid core material, a plurality of stacked laminations, or a split core material. The stator 270 further includes wire coils 276 positioned (e.g., wrapped about) radially inner portions of the core 274 and configured to induce an electrical current when the rotor 272 rotates. The wire coils 276 may include axial end turns 278 that extend axially beyond the core 274.

The rotor 272 has a rotor shaft 280 configured for rotation about the drive axis D. The rotor shaft 280 may be supported for rotation relative to the electric machine housing 192 by one or more bearings, for example roller bearing assemblies 282 mounted proximate each of the drive end 252 and the non-drive end 254. The rotor shaft 280 may be unitarily formed as a single integral part extending axially beyond the electric machine housing 192 to couple with the gear set 84, or may be a subassembly with two or more parts. The rotor 272 also includes a rotor core 284 mounted for co-rotation with the rotor shaft 280. The rotor core 284 is formed from a plurality of rotor laminations each carrying a plurality of permanent magnets (not shown) for magnetic field generation. The permanent magnets are circumferentially spaced about the drive axis D and arranged with alternating polarities so that rotation past the wire coils 276 of the stator 270 induces an alternating magnetic field.

The electric machine housing 192 encases a cooling circuit 290 that delivers coolant to both the electric machine 82 and the gear set 84 from a single source of coolant input 292 (e.g., liquid oil). In general, various parts and portions of the electric machine 82 may be sources of heat generation during use. To receive the coolant input 292, the electric machine housing 192 has an intermediate flange 294 located between the drive end 252 and the non-drive end 254. The intermediate flange 294 includes a coolant inlet port 296 for supplying coolant to the cooling circuit 290, which is the only source of directed coolant for both the electric machine 82 and the gear set 84. The electric machine housing 192 has a coolant outlet port 298 at the drive end 252 and formed in one of the mounting flanges 256. The coolant outlet port 298 is in fluid communication with the coolant inlet port 296. The coolant outlet port 298 fluidly couples the electric machine 82 to the mating gear set 84 at a threshold 300 between the components, thereby allowing a shared coolant supply without separate plumbing lines, fittings, etc. A mating interface coolant passage 302 of the intermediate housing 196 is positioned at the threshold 300 to receive coolant from the coolant outlet port 298 and convey coolant to carrier coolant passages 303 for distributing coolant about the gear set 84. The cooling circuit 290 is therefore a combined cooling circuit without any external hoses or lines to deliver coolant between the electric machine 82 and the gear set 84. Instead, the flow is contained within the electric machine housing 192, the intermediate housing 196, and the adapter housing 104. In particular, the coolant flows in series from an electric machine section 304 of the cooling circuit 290 to a gear set section 306 of the cooling circuit 290 by flowing through mating coolant passages (coolant outlet port 298 and interface coolant passage 302) at the threshold 300 of the electric machine housing 192 and the intermediate housing 196.

The electric machine housing 192 of the example electric drive 52 includes coolant passages 310 for providing a flow of coolant fluid throughout the electric machine 82, this flow being generally referred to as the electric machine section 304 of the cooling circuit 290. The coolant passages 310 may be integrally formed as a unitary part of the electric machine housing 192. The end section 262 of the electric machine housing 192 may also have coolant passages 310 formed therein. The coolant passages 310 include the coolant inlet port 296 for receiving the coolant input 292 and the coolant outlet port 298 for providing a coolant output to the gear set 84. The electric machine section 304 may be split into a stator feed circuit 312 and a rotor feed circuit 314 formed at least in part by the coolant passages 310. In the illustrated example, a passage intersection 316 is positioned downstream of the coolant inlet port 296 to divide flow to in three directions: to the gear set section 306 via the coolant outlet port 298, to the stator feed circuit 312 via serpentine coolant passages 318, and to the rotor feed circuit 314 via an outer axial passage 320. The rate of coolant flow to these various passages may be metered or otherwise controlled by orifices, nozzles, or the like (not shown). It will be appreciated that the intersection 316 along with the intermediate flange 294 may be positioned at any axial location along the electric machine housing 192 between the drive end 252 and the non-drive end 254. Used coolant from the electric machine section 304 may passively flow to the drive end 252 to drain through the intermediate housing 196 as the drain flow D1 or passively flow to the non-drive end 254 to pass through a drain conduit 322 in the drain component 230. The used coolant collected in the drain component subsequently may be recirculated (via various pumps, lines and fittings) to a hydraulic reservoir or tank 324, as shown schematically in FIG. 8.

The stator feed circuit 312 of the electric machine section 304 initially extends about a perimeter of the electric machine housing 192 with the serpentine coolant passages 318 in multiple branches spaced axially. The serpentine coolant passages 318 are formed on an interior peripheral surface 330 of the electric machine housing 192. For the stator feed circuit 312 in the illustrated example, coolant flows to the serpentine coolant passages 318 from the coolant input 292 via the intersection 316. As shown, coolant in the serpentine coolant passages 318 flows about a majority of a circumference of the interior peripheral surface 330 of the electric machine housing 192 in an axially central region of the casing, then the serpentine coolant passages 318 branch in both axial directions for coolant to flow about a majority of a circumference of the interior peripheral surface 330 proximate to the drive end 252 and the non-drive end 254. With this arrangement, coolant flow through the serpentine coolant passages 318 flows along in physical contact with an outer periphery of the core 274 of the stator 270 for direct convective cooling. In the illustrated example with three branches of the serpentine coolant passages 318, a substantial contact area is provided between coolant in the stator feed circuit 312 and the core 274 resulting in significant cooling. The serpentine coolant passages 318 may subsequently connect to one or more spray rings (not shown) for spraying coolant to the axial end turns 278 of the wire coils 276 of the stator 270.

The rotor feed circuit 314 is arranged to transfer a portion of the coolant input 292 from the coolant inlet port 296 to and through the parts of the rotor 272. The rotor feed circuit 314 initially extends axially away from the intersection 316 through the outer axial passage 320 toward the non-drive end 254 of the electric machine 82. Subsequently at the non-drive end 254, an end radial passage 332 (FIG. 7) extends radially inward toward the rotor 272. An axial coolant passage 334 (FIG. 8) extends through the rotor shaft 280 and along the drive axis D. The axial coolant passage 334 may provide coolant as spline lube at the drive end 252 for coupling with the gear set 84.

The rotor feed circuit 314 branches off from the axial coolant passage 334 to deliver coolant to and through the rotor core 284. In particular, one or more radial passages 336 intersect the axial coolant passage 334 and extend into the rotor core 284. Continuing from the one or more radial passages 336, the rotor core 284 includes axial coolant passages 338 to allow coolant to flow in both axial directions. The axial coolant passages 338 are circumferentially interspersed between the permanent magnets to deliver coolant axially throughout the rotor core 284 and among the plurality of rotor laminations. The rotor feed circuit 314 may also provide coolant passages to the roller bearing assemblies 282 via one or more bearing radial passages 340.

For the rotor feed circuit 314 of the illustrated example, coolant flow from the coolant input 292 passes the intersection 316 into the outer axial passage 320. Coolant then flows radially inwardly through the end radial passage 332 and on to the axial coolant passage 334 of the rotor shaft 280. In the axial coolant passage 334, coolant flows axially toward the drive end 252 while also branching off radially through the one or more radial passages 336 and the one or more bearing radial passages 340. From the one or more radial passages 336, the coolant flow branches in both axial directions through the axial coolant passage 338, passing through the rotor core 284 and out to drain at both the drive end non-drive (via the intermediate housing 196 as drain D1 in FIG. 10) and at the non-drive end 254 (via the conduit 322 as drain D4).

Figure 11:
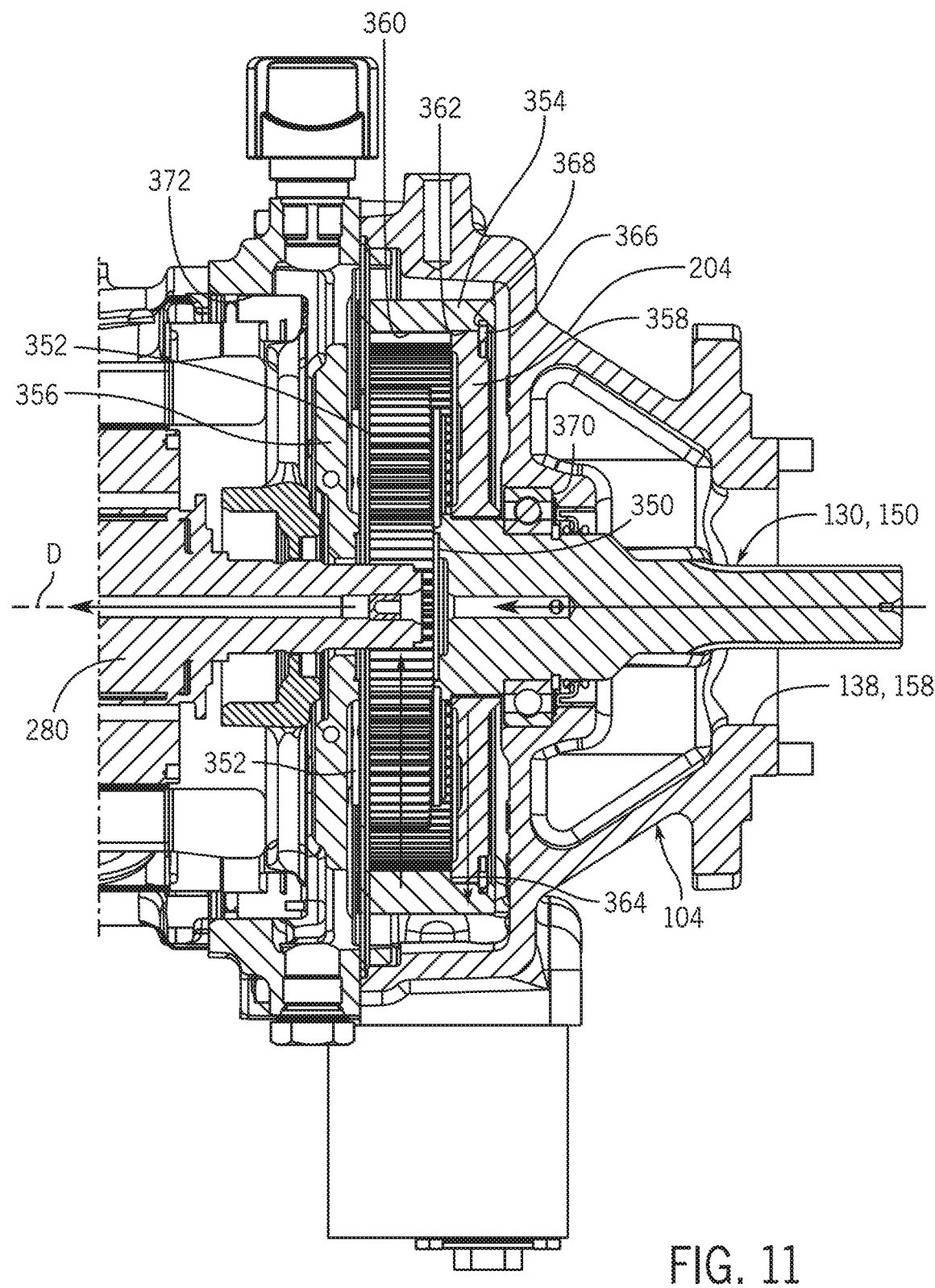
FIG. 11 is a cross-sectional view of the example transmission assembly taken at plane 11-11 of FIG. 7.

Referring also to FIGS. 8 and 11, internal structure of the electric drive 52 is shown in detail including the gear set 84 contained, at least in part, in the intermediate housing 196. Likewise, the adapter housing 104 fixedly mounts to the intermediate housing 196 and functions to contain, at least in part, the gear set 84 in the interior space 210. In the illustrated example, the gear set 84 is an epicyclic gear set including a sun gear 350, one or more planet gears 352, a ring gear 354, and a carrier 356. The carrier 356 in this example is a radially inner portion of the intermediate housing 196 and is therefore non-rotational while supporting the one or more planet gears 352 for rotation about a rotational axis of the sun gear 350. The rotational axis of the sun gear 350 in the illustrated example is the same as the drive axis D of the drive shaft 130, 150 and the rotor shaft 280 of the electric drive 52. The ring gear 354 includes a plate gear 358 that is an annular disk extending from a toothed or splined outer diameter meshed with the ring gear 354 to a toothed or splined inner diameter meshed with the drive shaft 130, 150 of the electric drive 52. The ring gear 354 in the illustrated example has two toothed regions 360 and 362 of different tooth count and/or configuration, with the toothed region 360 of the ring gear configured to mesh with teeth of the planet gears 352 and the toothed region 362 configured to mesh with the teeth at the outer diameter of the plate gear 358. The different count/configurations of the toothed regions 360 and 362 allow the ring gear 354 to interface at different gear ratios with the planet gears 352 and the plate gear 358. In some cases, however, the ring gear 354 may have a single toothed or splined section through its inner diameter that meshes with the planet gears 352 and the plate gear 358 with a common ratio. The plate gear 358 is held captive between a shoulder 364 of the ring gear 354 and a retaining ring 366 that fits in an annular groove 368 at the inner diameter of the ring gear 354 within the toothed region 362. The drive shaft 130, 150 is supported for rotation relative to the adapter housing 104 by one or more bearings, for example roller bearing assembly 370.

In the illustrated embodiment, the carrier 356 is integrally formed as unitary with the intermediate housing 196 (e.g., formed from the same material at the same time by the same process). Specifically, the carrier 356 is an annular disk-like portion of the intermediate housing 196 extending radially inward from an annular peripheral wall 372 extending axially, both of which extend about the drive axis D. The carrier includes pinion shafts or spindles (not shown) extending axially from the annular disk to mount the planet gears 352. Therefore, the carrier 356 of the gear set 84 not only works to set the gear ratio of the gear set 84 but it also serves as a portion of the intermediate housing 196 and may also have carrier coolant passages 303 forming part of the gear set section 306 of the cooling circuit 290.

Figure 9:
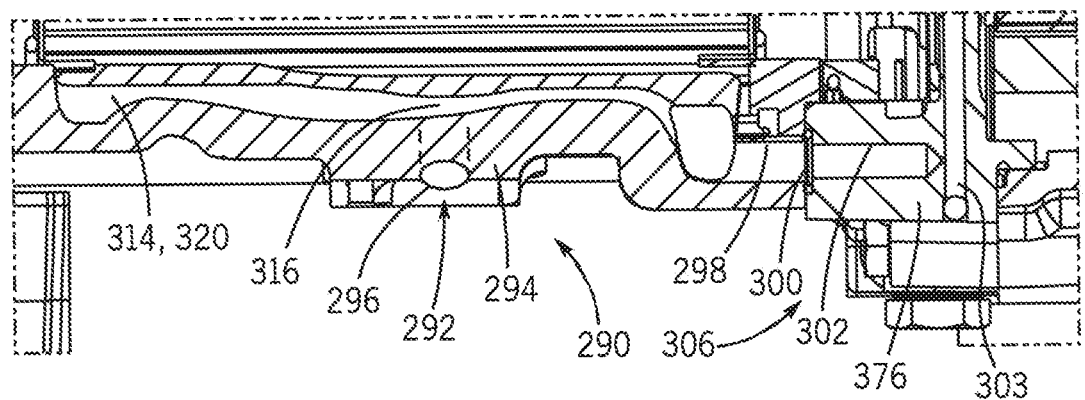
FIG. 9 is a partial cross-sectional view of the example electric drive taken at plane 9-9 of FIG. 7.

The intermediate housing 196 interfaces with the electric machine 82 to fixedly mount the gear set 84 to the electric machine 82. A plurality of mounting flanges 374 (FIG. 7) extend from the peripheral wall 372 of the intermediate housing 196, each mounting flange 374 having a mounting hole (not shown) for receiving fasteners such as the bolts 194 that fasten to the electric machine 82. A dual flange 376 (FIG. 9) of the intermediate housing 196 similarly extends from the peripheral wall 372 and includes both a mounting hole and the interface coolant passage 302. The mounting flanges 374 and corresponding holes are evenly spaced about the perimeter of the intermediate housing 196. Due to this symmetrical arrangement, the intermediate housing 196 may be mounted at different orientations as required for coupling with the electric machine 82. Likewise, the symmetrical arrangement of the bolts 203 allows the intermediate housing to be mounted at different orientations relative to the adapter housing 104.

Figure 10:
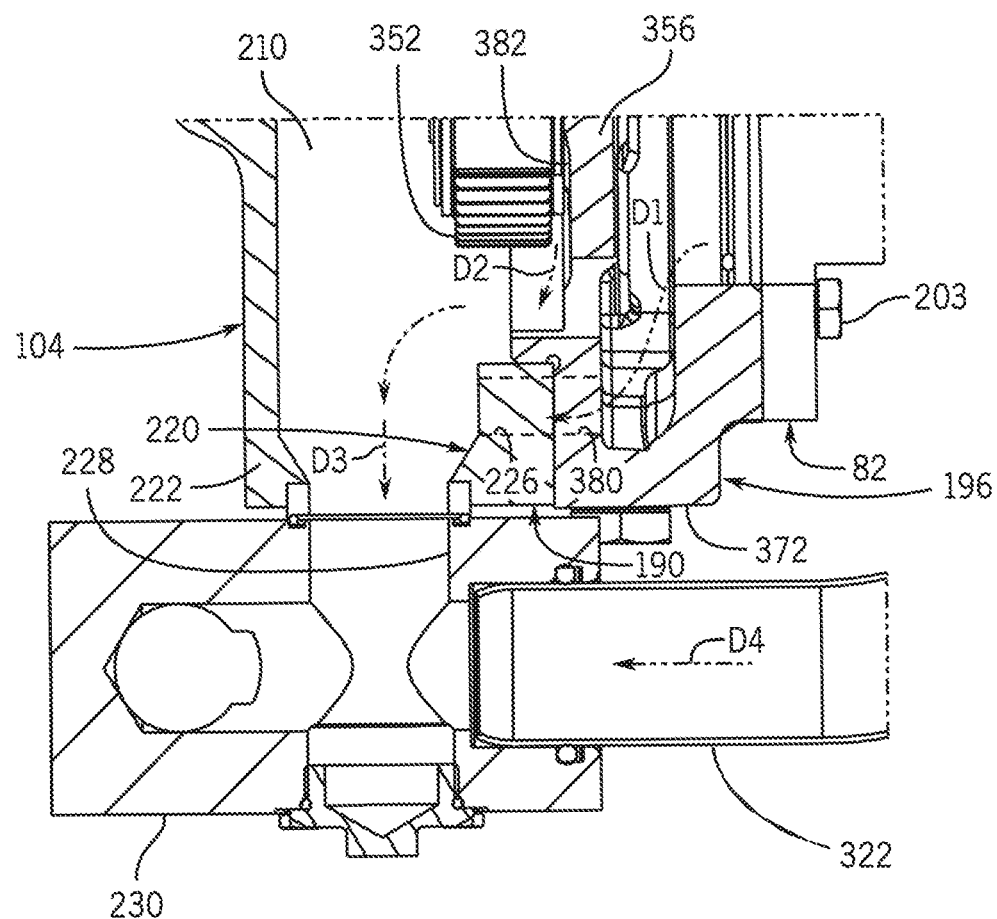
FIG. 10 is a partial cross-sectional view of the example drive assembly taken at plane 10-10 of FIG. 7 showing a drain area and outlet from the transmission assembly.

Referring also to FIG. 10, the various drain flows to the drain component 230 are shown in detail. Generally, various components of the electric drive 52, including electric machine 82 and the gear set 84, are provided with a coolant (e.g., pressurized oil or the like) that flows in the cooling circuit 290. This coolant eventually drains to multiple portions of the electric drive 52 before being collected at the drain component 230 positioned below the adapter housing 104 for subsequent reuse. In particular, a drive end drain flow D1 from the electric machine collects in the intermediate housing 196 and passes through an outlet passage 380 (shown in dashed lines) to the inlet port 226 of the drain well 220 of the adapter housing 104. A gear set drain flow D2 passes along a recessed area 382 in the carrier 356 of the intermediate housing 196 through the open portion 224 to collect in the drain well 220. These flows combine as a drain well flow D3 that passes into the drain component 230. A non-drive end flow D4 from the electric machine 82 passes through the drain conduit 322 to reach the drain component 230. In the alternative example where the electric machine 82 is rotated 180 degrees about the drive axis D, the cover feature 234 (FIG. 6) of the adapter housing 104 blocks off the outlet passage 380 of the intermediate housing 196. Used coolant that collects in the drain component 230 can be cooled actively or passively while being routed to the pumped to the coolant inlet port 296 of the electric machine 82 for redistribution throughout the electric drive 52.

FIG. 11 illustrates the power flow within the electric drive 52 reflecting a generator mode. In the generator mode, the engine 40 provides the power flow source coupled via the hydraulic motor/pump mount 100C, 100D, which provides mechanical power to the electric drive 52. Rotation from the hydraulic motor/pump mount 100C, 100D is transferred to the drive shaft 130, 150, which rotates with and drives the plate gear 358 and the ring gear 354 in unison, which in turn drives rotation of the planet gears 352. The carrier 356 remains fixed and thus the planet gears 352 drive rotation of the sun gear 350. The sun gear 350 interfaces with the rotor shaft 280 of the electric machine 82, and the resulting rotation of the permanent magnets in the rotor 272 induces a current in the wire coils 276 of the stator 270. Accordingly, in the generator mode, the gear set 84 provides a ring-in, sun-out configuration transferring power through the electric machine 82 along the path indicated by the arrows in FIG. 11, with the electric machine 82 converting mechanical energy to electrical energy.

The electric drive of the present disclosure may also be implemented in a drive mode, for example when operating as a motor at a wheel end drive. The gearing arrangement and connections of the gear set may remain the same in the drive mode, including the carrier being fixed (i.e., grounded) against rotation. The drive mode power flow is in the opposite axial direction from that of the generator mode illustrated in FIG. 11, beginning at the electric machine, which functions as a motor outputting rotational mechanical power. The electric machine may be energized due to a preceding power generation mode, or selectively energized via another source such as the battery 72. When energized, electrical current in the wire coils of the stator induces rotation of the permanent magnets of the rotor and therefore also rotation of the rotor shaft. The rotor shaft interfaces with the sun gear of the epicyclic gear set in the gear set, thereby driving the planet gears to rotate. Because the carrier is fixed, the planet gears are unable to revolve within the ring gear 354, and therefore rotation of the planet gears drives rotation of the ring gear. The ring gear rotates with the plate gear and the drive shaft outputting mechanical power (e.g., rotation) to the hydraulic pump/motor mount for transfer to another component of the work vehicle. Accordingly, in the drive mode, the gear set provides a sun-in, ring-out configuration with the electric machine converting electrical energy to mechanical energy.

As another example arrangement not illustrated, the auxiliary power system may be located entirely offboard the work vehicle. In certain examples, the towed work implements are a commodity cart providing bulk supply (e.g., seed) to a seeding machine. The commodity cart could have a hydraulic system with a hydraulic pump/motor mount in which the electric drive of the present disclosure is mounted to power one or more components of the commodity cart. This component could be a wheel end drive similar to FIG. 2, a powered axle, or other features of the commodity cart.

Additionally or alternatively, components of the auxiliary power system, including the hydraulic pump/motor mount and the disclosed electric drive, may be located on the seeding machine, for example, to electrically power a foldable spreader wing, a positionable tiller/knife and so on. The electric drive may mount to a hydraulic pump manifold for receiving mechanical power from the transmission (e.g., via a power takeoff (PTO)) and may transfer this power to one or more auxiliary outputs (e.g., via internal gear train(s)). The gear set of the electric drive may be mechanically coupled to an output of the hydraulic pump manifold for transferring torque. With this arrangement, the hydraulic pump manifold drives rotation of the gear set, which turns the electric machine functioning as a generator, converting mechanical power to electrical power. The inverter converts the electric power to AC, which is then conveyed to the second electric machine that drives the powered component. These components may thus be physically carried by one of the towed vehicles and operated under primary hydraulic power from the towing vehicle.

The electric drive of the present disclosure may be installed in various locations on a work vehicle or a work implement and may provide the functionality of a motor, a generator, or a reversible motor/generator. The electric drive may replace various types of hydraulic pump/motor arrangements. In some cases, pressurized hydraulic fluid may be run through a power takeoff (PTO) shaft or in other cases through separate hydraulic lines. The hydraulic system may be a single hydraulic power source distributing hydraulic power throughout the work vehicle train. It may also include primary and secondary hydraulic power sources with the secondary hydraulic power source fed by the primary hydraulic power source and physically located remote therefrom on the same or a different vehicle of the work vehicle train. The work implement thus may be hydraulically powered by the primary hydraulic power source or a combination of the primary and secondary hydraulic power sources and either through hydraulic fluid connections or mechanical connections to the driven component. The mechanical power may either directly interface with the driven component or by an intermediate mechanical connection (e.g., the PTO) between the hydraulic power source and the driven component. Thus, the hydraulic power may be converted directly to electric power or first to mechanical power prior to electric. The electric drive may provide electrification at a mount associated with any of these hydraulic system arrangements. Mounting locations for the adapter housing of the electric drive may be designed to conform to SAE hydraulic mount standards, even if such mounting locations are not intended for a hydraulic pump/motor, for sake of allowing interoperability with the example electric drive. In this manner, the electric drive may connect to various subsystems or components of the work vehicle, such as a gear assembly of a pump drive. In other implementations, the electric drive may connect to other components, such as an engine flywheel damper, a mechanical connection to an engine shaft, or other auxiliary components of the work vehicle. It is also noted that other types of gear sets are applicable to the present disclosure for providing similar gear reduction between the electric drive and the connected subsystem/component.

Enumerated Examples of Electric Drive

Also, the following examples are provided, which are numbered for easier reference.

1. An electric drive assembly for operation with a component of a work vehicle having an SAE standard hydraulic pump/motor mount, the electric drive assembly including: an electric machine having a shaft and a mounting flange; an adapter housing defining an interior space between a component mounting flange and an electric machine mounting flange, the electric machine mounting flange sized and configured to mate with the mounting flange of the electric machine, the component mounting flange having a bolt hole pattern and a mounting pad each of a complementary size and configuration to that of the SAE standard hydraulic pump/motor mount; and a gear set at least in part disposed in the interior space of the adapter housing and configured to effect a gear ratio change and transfer power between the shaft of the electric machine and a drive shaft.

2. The drive assembly of example 1, wherein the SAE standard hydraulic pump/motor mount is an SAE C hydraulic pump/motor mount or an SAE D hydraulic pump/motor mount; and wherein the component mounting flange of the adapter housing is a complementary SAE C hydraulic pump/motor mount or SAE D hydraulic pump/motor mount.

3. The drive assembly of example 1, wherein the SAE standard hydraulic pump/motor mount is an SAE C hydraulic pump/motor mount; wherein the component mounting flange of the adapter housing is a complementary SAE C hydraulic pump/motor mount including a corresponding bolt hole pattern and mounting pad; and wherein the component mounting flange of the adapter housing includes one or features of an SAE D hydraulic pump/motor mount.

4. The drive assembly of example 3, wherein the one or more features of an SAE D hydraulic pump/motor mount includes a bolt hole pattern and a mounting pad of an SAE D hydraulic pump/motor mount; and wherein the bolt hole pattern and the mounting pad of an SAE D hydraulic pump/motor mount are located in spaced relation to the bolt hole pattern and the mounting pad of an SAE C hydraulic pump/motor mount.

5. The drive assembly of example 1, wherein the adapter housing is cast as a unitary component having one or more features for each of multiple SAE hydraulic pump/motor mounts.

6. The drive assembly of example 1, wherein the adapter housing defines a drain well with a drain opening configured to interface the interior space with a drain component to direct coolant from a drain of the electric machine to the drain component; wherein the electric machine mounting flange, at least in part, defines the drain well of the adapter housing; and wherein the electric machine mounting flange defines a cover feature configured to close off coolant passage of the electric machine.

7. The drive assembly of example 1, wherein the gear set is a planetary set having a ring gear, a sun gear, and planet gears mounted to a carrier; and wherein the ring gear is coupled for co-rotation with the drive shaft and the sun gear is coupled for co-rotation with the shaft of the electric machine; wherein the carrier is fixed against rotation with respect to the adapter housing.

8. The drive assembly of example 7, wherein the electric machine is configured to operate alternatively in a first power flow direction as a motor and as a generator in a second power flow direction opposite the first power flow direction; and wherein the planetary set is configured as sun in, ring out in the first power flow direction and ring in, sun out in the second power flow direction.

9. A method of manufacturing an electric drive assembly for operation with a component of a work vehicle having an SAE standard hydraulic pump/motor mount, the method including: providing an electric machine having a shaft and a mounting flange; forming an adapter housing defining an interior space between a component mounting flange and an electric machine mounting flange, the electric machine mounting flange sized and configured to mate with the mounting flange of the electric machine, the component mounting flange having a bolt hole pattern and a mounting pad each of a complementary size and configuration to that of the SAE standard hydraulic pump/motor mount; mounting the mounting flange of the electric machine to the electric machine mounting flange of the adapter housing; and installing a gear set at least in part in the interior space of the adapter housing to couple the shaft of the electric machine to a drive shaft, the gear set configured to effect a gear ratio change and transfer power between the shaft of the electric machine and the drive shaft.

10. The method of example 9, wherein the SAE standard hydraulic pump/motor mount is an SAE C hydraulic pump/motor mount or an SAE D hydraulic pump/motor mount; and wherein the component mounting flange of the adapter housing is a complementary SAE C hydraulic pump/motor mount or SAE D hydraulic pump/motor mount.

11. The method of example 10, wherein the forming of the adapter housing includes casting the adapter housing as a unitary part with the component mounting flange and the electric machine mounting flange; and further including machining one or more features of the SAE C hydraulic pump/motor mount and the SAE D hydraulic pump/motor mount; wherein the machining includes drilling a bolt hole pattern in the adapter housing for the SAE C hydraulic pump/motor mount; and wherein the machining includes abrading one or more surfaces of a mounting pad for the SAE C hydraulic pump/motor mount or the SAE D hydraulic pump/motor mount.

12. The method of example 10, wherein the SAE standard hydraulic pump/motor mount is an SAE C hydraulic pump/motor mount; wherein the component mounting flange of the adapter housing is a complementary SAE C hydraulic pump/motor mount; and wherein the component mounting flange of the adapter housing includes one or features of an SAE D hydraulic pump/motor mount.

13. The method of example 12, wherein the forming of the adapter housing includes casting the adapter housing as a unitary part with the component mounting flange and the electric machine mounting flange; and further including machining one or more features of the SAE C hydraulic pump/motor mount and the SAE D hydraulic pump/motor mount; wherein the machining includes drilling a bolt hole pattern in the adapter housing for the SAE C hydraulic pump/motor mount; and wherein the machining includes abrading one or more surfaces of a mounting pad for the SAE C hydraulic pump/motor mount.

14. The method of example 9, wherein the adapter housing defines a drain well with a drain opening configured to interface the interior space with a drain component to direct coolant from a drain of the electric machine to the drain component; wherein the electric machine mounting flange, at least in part, defines the drain well of the adapter housing; and wherein the electric machine mounting flange defines a cover feature configured to close off a coolant passage of the electric machine.

15. The method of example 14, wherein the gear set is a planetary set having a ring gear, a sun gear, and planet gears mounted to a carrier; wherein the ring gear is coupled for co-rotation with the drive shaft and the sun gear is coupled for co-rotation with the shaft of the electric machine; wherein the carrier is fixed against rotation with respect to the adapter housing; and wherein the planetary set is configured to transfer power as sun in, ring out in a first power flow direction and as ring in, sun out in a second power flow direction opposite the first power flow direction.

CONCLUSION

The examples discussed above result in a variety of benefits of the disclosed electric drive. For example, the electric drive may replace a hydraulic pump/motor arrangement with significantly fewer parts and installation steps, saving time and costs. The electric drive is readily adaptable to a variety of implementations onboard or offboard a work vehicle. The single raw casting of the adapter housing allows for reduced manufacturing costs because the casting process does not have to be changed for each version of the adapter housing.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications and variations on the described example(s). Accordingly, various embodiments and implementations other than those explicitly described are within the scope of the following claims.

What is claimed is:

1. An electric drive assembly for operation with a component of a work vehicle having an SAE standard hydraulic pump/motor mount, the electric drive assembly comprising:
  an electric machine having a shaft and a mounting flange;
  an adapter housing defining an interior space between a component mounting flange and an electric machine mounting flange, the electric machine mounting flange sized and configured to mate with the mounting flange of the electric machine, the component mounting flange having a bolt hole pattern and a mounting pad each of a complementary size and configuration to that of the SAE standard hydraulic pump/motor mount, wherein the adapter housing is a unitary cast part with the component mounting flange and the electric machine mounting flange and with the component mounting flange having features of multiple SAE standard hydraulic pump/motor mounts, and wherein one or more of the features of the multiple SAE standard hydraulic pump/motor mounts are machined so that the component mounting flange defines a dedicated SAE standard hydraulic pump/motor mount; and
  a gear set at least in part disposed in the interior space of the adapter housing and configured to effect a gear ratio change and transfer power between the shaft of the electric machine and a drive shaft.

2. The drive assembly of claim 1, wherein the dedicated SAE standard hydraulic pump/motor mount of the component mounting flange defines an SAE C hydraulic pump/motor mount or an SAE D hydraulic pump/motor mount.

3. The drive assembly of claim 2, wherein the cast adapter housing defines in the component mounting flange features of an SAE C hydraulic pump/motor mount and features of an SAE D hydraulic pump/motor mount; and
wherein the cast adapter housing is machined so that the component mounting flange defines only the features of the SAE C hydraulic pump/motor mount.

4. The drive assembly of claim 3, wherein the cast adapter housing includes an annular mounting pad of the SAE D hydraulic pump/motor mount and an annular mounting pad of the SAE C hydraulic pump/motor mount; and
wherein the annular mounting pad of the SAE D hydraulic pump/motor mount is machined away so that the component mounting flange defines only the SAE C hydraulic pump/motor mount.

5. The drive assembly of claim 1, wherein the adapter housing defines a drain well with a drain opening configured to interface the interior space with a drain component to direct coolant from a drain of the electric machine to the drain component.

6. The drive assembly of claim 5, wherein the electric machine mounting flange, at least in part, defines the drain well of the adapter housing.

7. The drive assembly of claim 6, wherein the electric machine mounting flange defines a cover feature configured to close off a coolant passage of the electric machine.

8. The drive assembly of claim 1, wherein the gear set is a planetary set having a ring gear, a sun gear, and planet gears mounted to a carrier; and
wherein the ring gear is coupled for co-rotation with the drive shaft and the sun gear is coupled for co-rotation with the shaft of the electric machine.

9. The drive assembly of claim 8, wherein the carrier is fixed against rotation with respect to the adapter housing.

10. The drive assembly of claim 8, wherein the electric machine is configured to operate alternatively in a first power flow direction as a motor and as a generator in a second power flow direction opposite the first power flow direction; and
wherein the planetary set is configured as sun in, ring out in the first power flow direction and ring in, sun out in the second power flow direction.

11. A method of manufacturing an electric drive assembly for operation with a component of a work vehicle having an SAE standard hydraulic pump/motor mount, the method comprising:
providing an electric machine having a shaft and a mounting flange;
forming an adapter housing defining an interior space between a component mounting flange and an electric machine mounting flange, the electric machine mounting flange sized and configured to mate with the mounting flange of the electric machine, the component mounting flange having a bolt hole pattern and a mounting pad each of a complementary size and configuration to that of the SAE standard hydraulic pump/motor mount, wherein forming the adapter housing includes casting the adapter housing as a unitary part with the component mounting flange and the electric machine mounting flange and with the component mounting flange having features of multiple SAE standard hydraulic pump/motor mounts and machining one or more of the features of the multiple SAE standard hydraulic pump/motor mounts so that the component mounting flange defines a dedicated SAE standard hydraulic pump/motor mount;
mounting the mounting flange of the electric machine to the electric machine mounting flange of the adapter housing; and
installing a gear set at least in part in the interior space of the adapter housing to couple the shaft of the electric machine to a drive shaft, the gear set configured to effect a gear ratio change and transfer power between the shaft of the electric machine and the drive shaft.

12. The method of claim 11, wherein the component mounting flange of the adapter housing defines an SAE C hydraulic pump/motor mount or an SAE D hydraulic pump/motor mount.

13. The method of claim 12, wherein the machining includes drilling a bolt hole pattern in the adapter housing for the SAE C hydraulic pump/motor mount.

14. The method of claim 13, wherein the machining includes abrading one or more surfaces of a mounting pad for the SAE C hydraulic pump/motor mount or the SAE D hydraulic pump/motor mount.

15. The method of claim 11, wherein, after being machined, the component mounting flange of the adapter housing defines an SAE C hydraulic pump/motor mount; and
wherein, prior to being machined, the component mounting flange of the adapter housing includes one or more features of an SAE D hydraulic pump/motor mount.

16. The method of claim 15,
wherein the machining includes drilling a bolt hole pattern in the component mounting flange for the SAE C hydraulic pump/motor mount; and
wherein the machining includes abrading one or more surfaces of the component mounting flange to define a mounting pad for the SAE C hydraulic pump/motor mount.

17. The method of claim 11, wherein the adapter housing defines a drain well with a drain opening configured to interface the interior space with a drain component to direct coolant from a drain of the electric machine to the drain component;
wherein the electric machine mounting flange, at least in part, defines the drain well of the adapter housing; and
wherein the electric machine mounting flange defines a cover feature configured to close off a coolant passage of the electric machine.

18. The method of claim 17, wherein the gear set is a planetary set having a ring gear, a sun gear, and planet gears mounted to a carrier;
wherein the ring gear is coupled for co-rotation with the drive shaft and the sun gear is coupled for co-rotation with the shaft of the electric machine;
wherein the carrier is fixed against rotation with respect to the adapter housing; and
wherein the planetary set is configured to transfer power as sun in, ring out in a first power flow direction and as ring in, sun out in a second power flow direction opposite the first power flow direction.

* * * * *